(12) United States Patent
Davison et al.

(10) Patent No.: US 7,683,586 B2
(45) Date of Patent: Mar. 23, 2010

(54) METHOD AND SYSTEM OF FAULT POWERED SUPPLY VOLTAGE REGULATION

(76) Inventors: William C. Davison, 2451 5$^{th}$ Ave. SE., Cedar Rapids, IA (US) 52403; David Joseph Dunne, 3807 Terrace Hill Dr. NE., Cedar Rapids, IA (US) 52402; Kevin John Malo, 835 Oakcrest, Iowa City, IA (US) 52246; Steve M. Meehleder, 505 Huntington Ridge Rd., Cedar Rapids, IA (US) 52402

( * ) Notice: Subject to any disclaimer, the term of this patent is extended or adjusted under 35 U.S.C. 154(b) by 311 days.

(21) Appl. No.: 11/824,683

(22) Filed: Jul. 2, 2007

(65) Prior Publication Data
US 2008/0048624 A1    Feb. 28, 2008

Related U.S. Application Data

(60) Provisional application No. 60/831,006, filed on Jul. 14, 2006.

(51) Int. Cl.
*H02J 7/00* (2006.01)
*H02J 7/04* (2006.01)
*H02J 7/16* (2006.01)

(52) U.S. Cl. ................. 320/166; 320/139; 320/162

(58) Field of Classification Search ............ 320/166, 320/167
See application file for complete search history.

(56) References Cited

U.S. PATENT DOCUMENTS

| | | | |
|---|---|---|---|
| 4,301,435 A | 11/1981 | Castonguay et al. | 335/26 |
| 4,679,019 A | 7/1987 | Todaro et al. | 335/172 |
| 4,951,052 A | 8/1990 | Jacob et al. | 341/122 |
| 4,992,723 A | 2/1991 | Zylstra et al. | 323/284 |

(Continued)

FOREIGN PATENT DOCUMENTS

EP    0 303 994 A    2/1989

(Continued)

OTHER PUBLICATIONS

Written Opinion corresponding to co-pending International Patent Application Serial No. PCT/US2007/015914, European Patent Office, dated Mar. 14, 2008, 8 pages.

(Continued)

*Primary Examiner*—Edward Tso
*Assistant Examiner*—Ahmed Omar (57) ABSTRACT

A method and system for supply voltage regulation in a motor circuit protector (MCP) that includes a current transformer coupled to a rectifier and a stored energy circuit. A solenoid is actuated by that circuit when a sufficient voltage is present. A controller having a configurable input is coupled to the stored energy circuit. Upon startup of the motor circuit protector, the controller causes the stored energy circuit to be charged to a startup voltage level via secondary current from the current transformer. The controller periodically interrupts the charging to measure the secondary current to detect fault levels. During startup, the configurable input is set to a comparator input for rapid current measurements. During run mode, the configurable input is set to an A/D input for accurate measurements. The controller measures the voltage of the stored energy circuit while charging it to a power level sufficient to actuate the solenoid.

20 Claims, 8 Drawing Sheets

U.S. PATENT DOCUMENTS

| | | | |
|---|---|---|---|
| 5,014,025 A | 5/1991 | Papallo, Jr. et al. | 335/167 |
| 5,124,875 A | 6/1992 | Ishii et al. | 361/93 |
| 5,276,416 A | 1/1994 | Ozaki | 335/18 |
| 5,343,179 A | 8/1994 | Pipich et al. | 335/167 |
| 5,510,773 A | 4/1996 | Rodgers | 340/638 |
| 5,646,586 A | 7/1997 | Castonguay et al. | 335/132 |
| 5,666,256 A | 9/1997 | Zavis et al. | 361/115 |
| 5,670,923 A | 9/1997 | Gonzalez et al. | 335/177 |
| 5,701,111 A | 12/1997 | Castonguay et al. | 335/177 |
| 5,710,399 A | 1/1998 | Castonguay et al. | 200/17 R |
| 6,009,615 A | 1/2000 | McKean et al. | 29/602.1 |
| 6,031,195 A | 2/2000 | Meili et al. | 200/318 |
| 6,061,217 A | 5/2000 | Grunert et al. | 361/42 |
| 6,084,756 A | 7/2000 | Doring et al. | 361/45 |
| 6,154,115 A | 11/2000 | Flohr | 337/13 |
| 6,351,232 B1 | 2/2002 | Marie | 341/155 |
| 7,307,504 B1 | 12/2007 | Carlino et al. | 336/213 |
| 2002/0145416 A1 | 10/2002 | Attarian et al. | 324/127 |

FOREIGN PATENT DOCUMENTS

| | | |
|---|---|---|
| EP | 0 477 936 A | 4/1992 |
| EP | 0 580 473 A | 1/1994 |
| GB | 397 635 A | 8/1933 |
| GB | 1 293 134 A | 10/1972 |
| GB | 2 360 135 A | 9/2001 |
| WO | WO 2006/087342 A1 | 8/2006 |

OTHER PUBLICATIONS

International Search Report corresponding to co-pending International Patent Application Serial No. PCT/US2007/015914, European Patent Office, dated Mar. 14, 2008, 8 pages.

METHOD AND SYSTEM OF FAULT POWERED SUPPLY VOLTAGE REGULATION

RELATED APPLICATION

This application claims the benefit of U.S. Provisional Application No. 60/831,006, filed Jul. 14, 2006, titled "Motor Circuit Protector," which is hereby incorporated by reference in its entirety.

FIELD OF THE INVENTION

The present invention relates generally to circuit breaker devices, and, in particular, to a fault power supply voltage regulation scheme.

BACKGROUND OF THE INVENTION

A fault-powered supply receives a fault current from a line conductor and powers electrical components from the fault current. An important electrical component of some circuit breakers is a solenoid, which must attain a predetermined voltage in order to energize an actuator that causes a trip mechanism of the circuit breaker to trip the circuit breaker. As is well known, a circuit breaker is an automatically operated electro-mechanical device designed to protect conductors from damage caused by an overload or a short circuit. Circuit breakers may also be utilized to protect loads. A circuit breaker may be tripped by an overload or short circuit, which causes an interruption of power to the load. A circuit breaker can be reset (either manually or automatically) to resume current flow to the load. One application of circuit breakers is to protect motors as part of a motor control center ("MCC"). A typical MCC includes a temperature triggered overload relay, a contactor and a motor circuit protector ("MCP"). The MCP is a specialized circuit breaker that provides instantaneous protection against instantaneous short-circuit events.

It is important to rapidly charge and maintain a sufficient voltage across the solenoid to cause a trip mechanism of the circuit breaker to trip when a trip event is detected. If the solenoid is not sufficiently powered or not powered rapidly enough, when a trip event needs to occur, a delay can be introduced. When transitioning between un-powered and powered modes of the circuit breaker, the voltage levels across the solenoid can be unpredictable, leading to nuisance trips such as when fault powered current falls below the lowest pickup threshold.

What is needed is a way to regulate voltage for a circuit protection device of a motor circuit protector. There is also a need for a voltage regulation module that provides rapid charging for energy storage for actuating a circuit breaker mechanism. There is also a need for a voltage regulation module that provides for accurate measurement of energy stored for actuating a circuit breaker mechanism.

SUMMARY OF THE INVENTION

Aspects of embodiments disclosed herein implement a fault-powered voltage regulation control algorithm with a wide operating range, such as 9 $A_{rms}$ through to 2500 $A_{rms}$. The embedded software control algorithm utilizes re-configurable microcontroller technology to minimize power supply peak overshoot, minimize voltage regulation ripple, and maintain stored energy trip voltages. Numerous advantages are realized, including at least the following: improved system level performance while reducing the requirements for expensive external hardware components; reduced risk of nuisance tripping of the trip unit system while the system is transitioning between powered and unpowered states; providing a robust fault tolerant backup trip detection system by cooperating with external backup trip circuitry; the power supply control algorithm can be applied to a variety of breaker products having different operating ranges and can be extended to other similar trip unit design platforms.

The algorithm cooperates with a power-supply activated, backup trip system. During normal operation, the algorithm maintains voltage regulation below backup trip setpoints. A variety of software and system failure modes will activate the backup trip detection circuitry. The voltage regulation control algorithm, according to certain aspects, includes the following:

On startup, the voltage regulation control algorithm configures the power supply for a brief charge-only state, so as to achieve power supply startup stability. This configuration reduces the expense of external stability hardware components. Then, the voltage regulation control algorithm configures the power supply voltage sense inputs to connect to fast reacting microcontroller comparator circuitry. This reduces peak overshoot during high instantaneous startup scenarios, while charging the power supply to stored energy trip voltages more efficiently. After stored energy trip levels have been reached, the microcontroller's internal circuitry is reconfigured to connect the power supply voltage sense inputs to more accurate internal analog-to-digital ("A/D") converters. This reconfiguration improves power supply ripple performance after startup. A variable number of charge pulses are generated each time the voltage regulator routine is serviced. These charge pulses have a fixed pulse width, adapted to correspond to the maximum allowable voltage ripple at the trip unit system's maximum charge rate. Voltage regulation is achieved over the entire pickup current range. If the fault-powered signals decrease below the lowest pickup thresholds, the voltage regulation control algorithm reverts to a charge-only state to avoid nuisance tripping.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
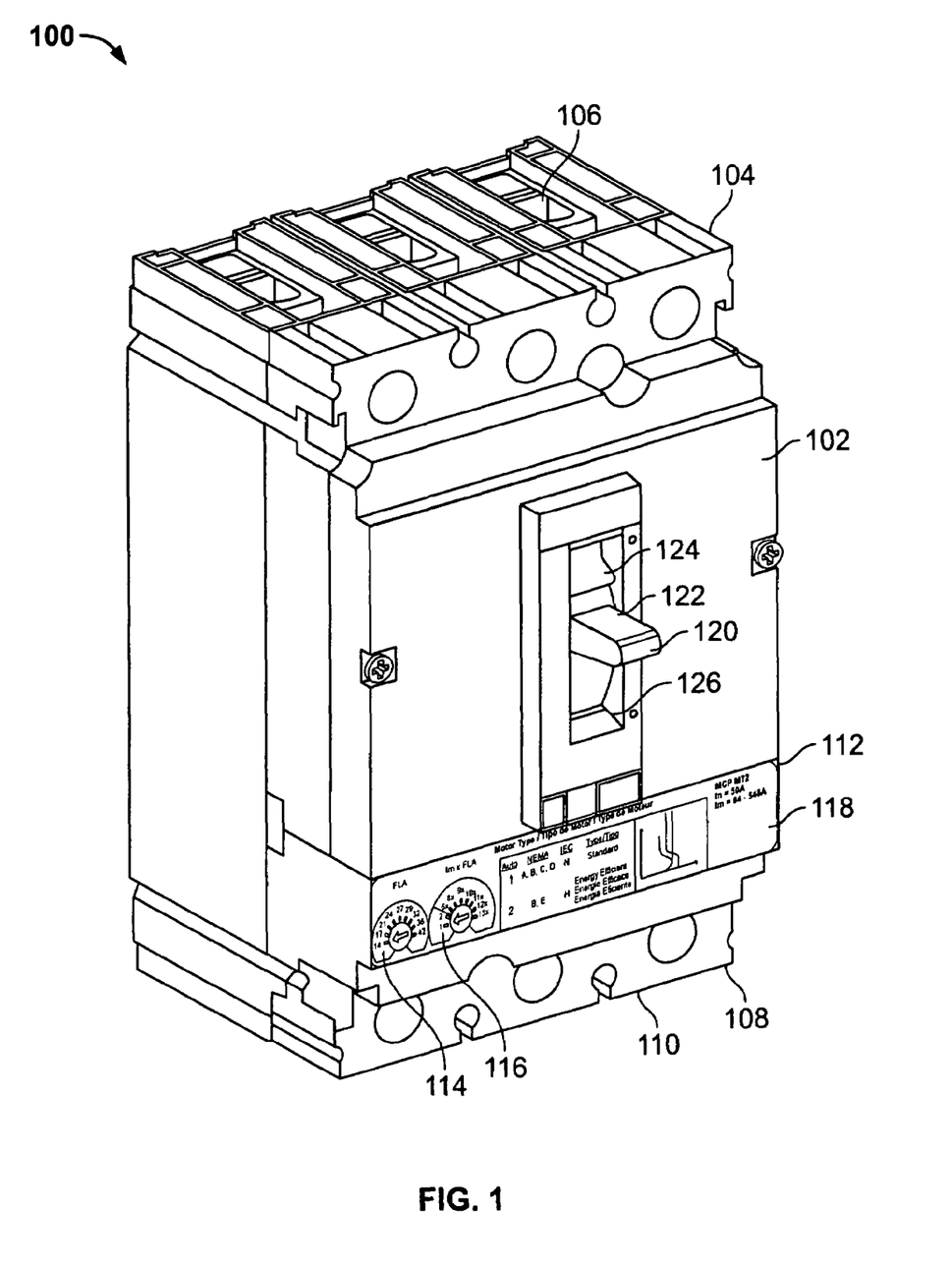
FIG. 1 is perspective view of a motor circuit protector according to the present application.

Turning now to FIG. 1, an electronic motor circuit protector 100 is shown. The motor circuit protector 100 includes a durable housing 102 including a line end 104 having line terminals 106 and a load end 108 having load lugs or terminals 110. The line terminals 106 allow the motor circuit protector 100 to be coupled to a power source and the load terminals 110 allow the motor circuit protector 100 to be coupled to an electrical load such as a motor as part of a motor control center ("MCC"). In this example the motor circuit protector 100 includes a three-phase circuit breaker with three poles, although the concepts described below may be used with circuit protectors with different numbers of poles, including a single pole.

The motor circuit protector 100 includes a control panel 112 with a full load ampere ("FLA") dial 114 and an instantaneous trip point ("$I_m$") dial 116 which allows the user to configure the motor circuit protector 100 for a particular type of motor to be protected within the rated current range of the motor circuit protector 100. The full load ampere dial 114 allows a user to adjust the full load which may be protected by the motor circuit protector 100. The instantaneous trip point dial 116 has settings for automatic protection (three levels in this example) and for traditional motor protection of a trip point from 8 to 13 times the selected full load amperes on the full load ampere dial 114. The dials 114 and 116 are located next to an instruction graphic 118 giving guidance to a user on the proper settings for the dials 114 and 116. In this example, the instruction graphic 118 relates to NEC recommended settings for the dials 114 and 116 for a range of standard motors. The motor circuit protector 100 includes a breaker handle 120 that is moveable between a TRIPPED position 122 (shown in FIG. 1), an ON position 124 and an OFF position 126. The position of the breaker handle 120 indicates the status of the motor circuit protector 100. For example, in order for the motor circuit protector 100 to allow power to flow to the load, the breaker handle 120 must be in the ON position 124 allowing power to flow through the motor circuit protector 100. If the circuit breaker is tripped, the breaker handle 120 is moved to the TRIPPED position 122 by a disconnect mechanism, causing an interruption of power and disconnection of downstream equipment. In order to activate the motor circuit protector 100 to provide power to downstream equipment or to reset the motor circuit protector 100 after tripping the trip mechanism, the breaker handle 120 must be moved manually from the TRIPPED position 120 to the OFF position 126 and then to the ON position 124.

Figure 2:
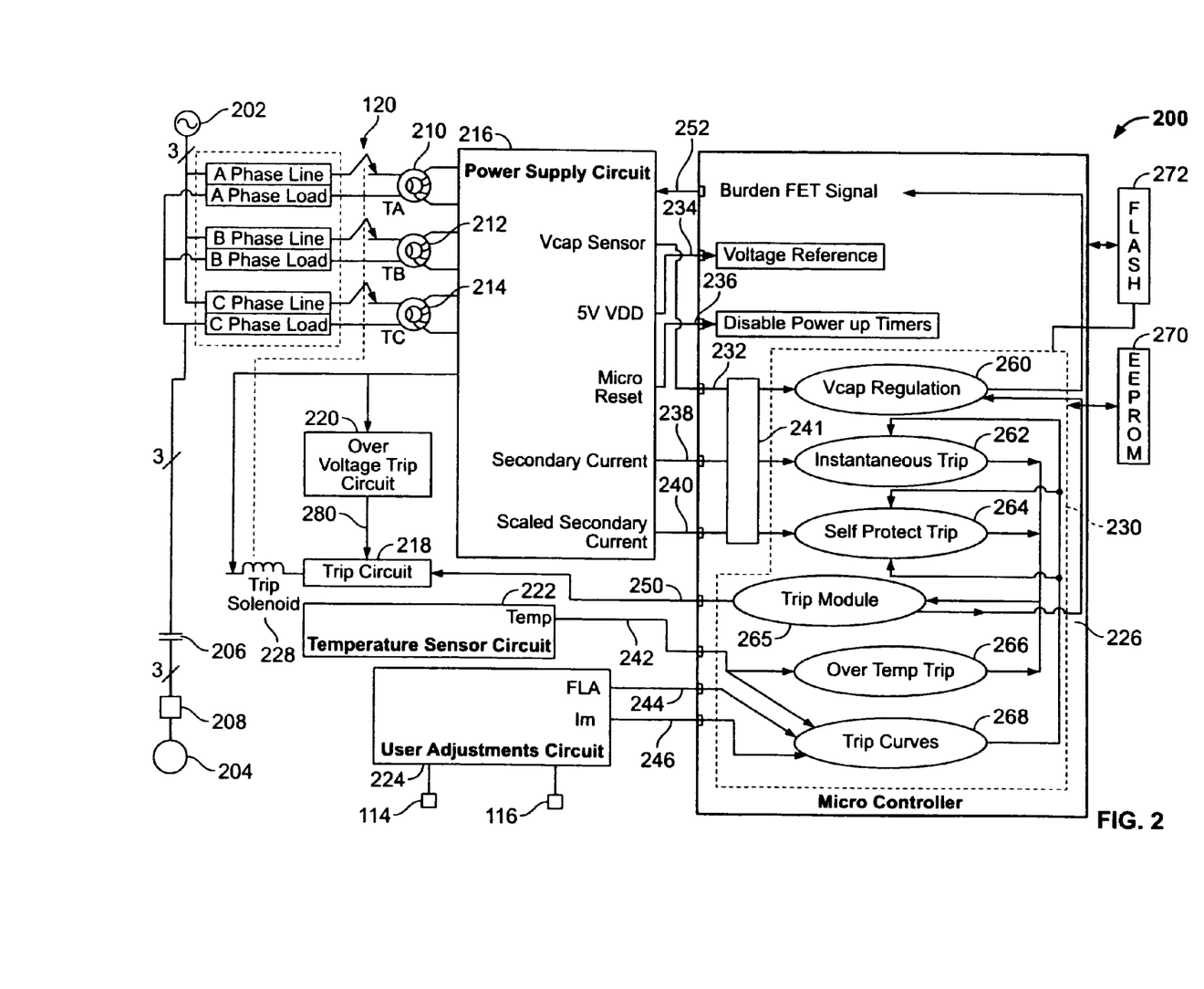
FIG. 2 is a functional block diagram of the motor circuit protector in FIG. 1.

FIG. 2 is a functional block diagram of the motor circuit protector 100 in FIG. 1 as part of a typical MCC configuration 200 coupled between a power source 202 and an electrical load such as a motor 204. The MCC configuration 200 also includes a contactor 206 and an overload relay 208 downstream from the power source 202. Other components such as a variable speed drive, start/stop switches, fuses, indicators and control equipment may reside either inside the MCC configuration 200 or outside the MCC configuration 200 between the power source 202 and the motor 204. The motor circuit protector 100 protects the motor 204 from a short circuit condition by actuating the trip mechanism, which causes the breaker handle 120 to move to the TRIPPED position when instantaneous short-circuit conditions are detected. The power source 202 in this example is connected to the three line terminals 106, which are respectively coupled to the primary windings of three current transformers 210, 212 and 214. Each of the current transformers 210, 212 and 214 has a phase line input and a phase load output on the primary winding. The current transformers 210, 212 and 214 correspond to phases A, B and C from the power source 202. The current transformers 210, 212 and 214 in this example are iron-core transformers and function to sense a wide range of currents. The motor circuit protector 100 provides instantaneous short-circuit protection for the motor 204.

The motor circuit protector 100 includes a power supply circuit 216, a trip circuit 218, an over-voltage trip circuit 220, a temperature sensor circuit 222, a user adjustments circuit 224, and a microcontroller 226. In this example, the microcontroller 226 is a PIC16F684-E/ST programmable microcontroller, available from Microchip Technology, Inc. based in Chandler, Ariz., although any suitable programmable controller, microprocessor, processor, etc. may be used. The microcontroller 226 includes current measurement circuitry 241 that includes a comparator and an analog-to-digital converter. The trip circuit 218 sends a trip signal to an electromechanical trip solenoid 228, which actuates a trip mechanism, causing the breaker handle 120 in FIG. 1 to move from the ON position 124 to the TRIPPED position 122, thereby interrupting power flow to the motor 204. In this example, the electromechanical trip solenoid 228 is a magnetic latching solenoid that is actuated by either stored energy from a discharging capacitor in the power supply circuit 216 or directly from secondary current from the current transformers 210, 212 and 214.

The signals from the three current transformers 210, 212 and 214 are rectified by a conventional three-phase rectifier circuit (not shown in FIG. 2), which produces a peak secondary current with a nominally sinusoidal input. The peak secondary current either fault powers the circuits 216, 218, 220, 222, and 224 and the microcontroller 226, or is monitored to sense peak fault currents. The default operational mode for current sensing is interlocked with fault powering as will be explained below. A control algorithm 230 is responsible for, inter alia, charging or measuring the data via analog signals representing the stored energy voltage and peak current presented to configurable inputs on the microcontroller 226. The control algorithm 230 is stored in a memory that can be located in the microcontroller 226 or in a separate memory device 272, such as a flash memory. The control algorithm 230 includes machine instructions that are executed by the microcontroller 226. All software executed by the microcontroller 226 including the control algorithm 230 complies with the software safety standard set forth in UL-489 SE and can also be written to comply with IEC-61508. The software requirements comply with UL-1998. As will be explained below, the configurable inputs may be configured as analog-to-digital ("A/D") converter inputs for more accurate comparisons or as an input to an internal comparator in the current measurement circuitry 241 for faster comparisons. In this example, the A/D converter in the current measurement circuitry 241 has a resolution of 8/10 bits, but more accurate A/D converters may be used and may be separate and coupled to the microcontroller 226. The output of the temperature sensor circuit 222 may be presented to the A/D converter inputs of the microcontroller 226.

The configurable inputs of the microcontroller 226 include a power supply capacitor input 232, a reference voltage input 234, a reset input 236, a secondary current input 238, and a scaled secondary current input 240, all of which are coupled to the power supply circuit 216. The microcontroller 226 also includes a temperature input 242 coupled to the temperature sensor circuit 222, and a full load ampere input 244 and an instantaneous trip point input 246 coupled to the user adjustments circuit 224. The user adjustments circuit 224 receives inputs for a full load ampere setting from the full load ampere dial 114 and either a manual or automatic setting for the instantaneous trip point from the instantaneous trip point dial 116.

The microcontroller 226 also has a trip output 250 that is coupled to the trip circuit 218. The trip output 250 outputs a trip signal to cause the trip circuit 218 to actuate the trip solenoid 228 to trip the breaker handle 120 based on the conditions determined by the control algorithm 230. The microcontroller 226 also has a burden resistor control output 252 that is coupled to the power supply circuit 216 to activate current flow across a burden resistor (not shown in FIG. 2) and maintain regulated voltage from the power supply circuit 216 during normal operation.

The breaker handle 120 controls manual disconnect operations allowing a user to manually move the breaker handle 120 to the OFF position 126 (see FIG. 1). The trip circuit 218 can cause a trip to occur based on sensed short circuit conditions from either the microcontroller 226, the over-voltage trip circuit 220 or by installed accessory trip devices, if any. As explained above, the microcontroller 226 makes adjustment of short-circuit pickup levels and trip-curve characteristics according to user settings for motors with different current ratings. The current path from the secondary output of the current transformers 210, 212, 214 to the trip solenoid 228 has a self protection mechanism against high instantaneous fault currents, which actuates the breaker handle 120 at high current levels according to the control algorithm 230.

The over-voltage trip circuit 220 is coupled to the trip circuit 218 to detect an over-voltage condition from the power supply circuit 216 to cause the trip circuit 218 to trip the breaker handle 120 independently of a signal from the trip output 250 of the microcontroller 226. The temperature sensor circuit 222 is mounted on a circuit board proximate to a copper burden resistor (not shown in FIG. 2) together with other electronic components of the motor circuit protector 100. The temperature sensor circuit 222 and the burden resistor are located proximate each other to allow temperature coupling between the copper traces of the burden resistor and the temperature sensor. The temperature sensor circuit 222 is thermally coupled to the power supply circuit 216 to monitor the temperature of the burden resistor. The internal breaker temperature is influenced by factors such as the load current and the ambient temperatures of the motor circuit protector 100. The temperature sensor 222 provides temperature data to the microcontroller 226 to cause the trip circuit 218 to actuate the trip solenoid 228 if excessive heat is detected. The output of the temperature sensor circuit 222 is coupled to the microcontroller 226, which automatically compensates for operation temperature variances by automatically adjusting trip curves upwards or downwards.

The microcontroller 226 first operates the power supply circuit 216 in a startup mode when a reset input signal is received on the reset input 236. A charge mode provides voltage to be stored for actuating the trip solenoid 228. After a sufficient charge has been stored by the power supply circuit 216, the microcontroller 226 shifts to a normal operation mode and monitors the power supply circuit 216 to insure that sufficient energy exists to power the electromechanical trip solenoid 228 to actuate the breaker handle 120. During each of these modes, the microcontroller 226 and other components monitor for trip conditions.

The control algorithm 230 running on the microcontroller 226 includes a number of modules or subroutines, namely, a voltage regulation module 260, an instantaneous trip module 262, a self protection trip module 264, an over temperature trip module 266 and a trip curves module 268. The modules 260, 262, 264, 266 and 268 generally control the microcontroller 226 and other electronics of the motor circuit protector 100 to perform functions such as governing the startup power, establishing and monitoring the trip conditions for the motor circuit protector 100, and self protecting the motor circuit protector 100. A storage device 270, which in this example is an electrically erasable programmable read only memory (EEPROM), is coupled to the microcontroller 226 and stores data accessed by the control algorithm 230 such as trip curve data and calibration data as well as the control algorithm 230 itself. Alternately, instead of being coupled to the microcontroller 226, the EEPROM may be internal to the microcontroller 226.

Figure 3:
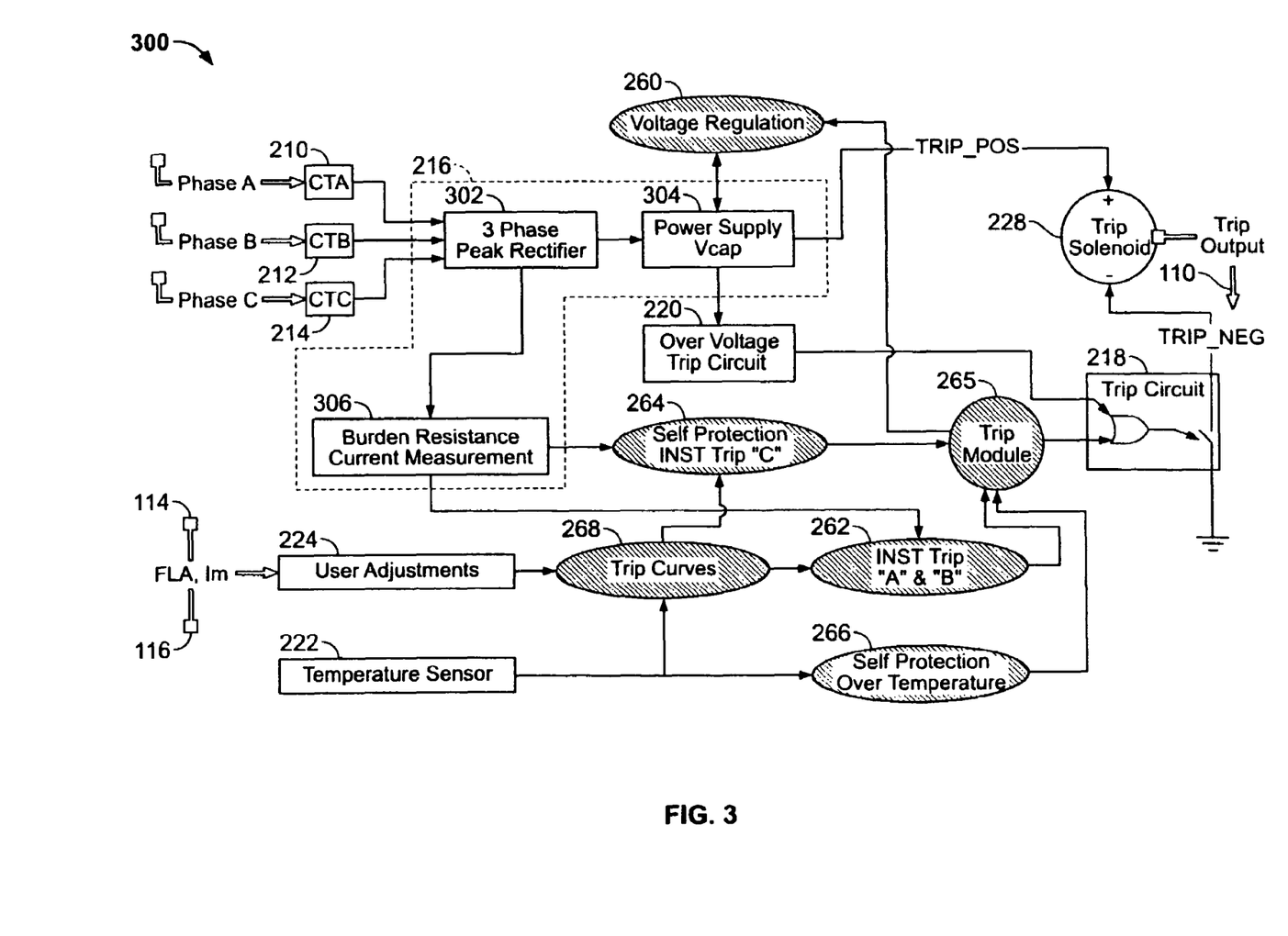
FIG. 3 is a functional block diagram of operating components of a control algorithm of the motor circuit protector in FIG. 1.

FIG. 3 is a functional block diagram 300 of the interrelation between the hardware components shown in FIG. 2 and software/firmware modules 260, 262, 264, 266 and 268 of the control algorithm 230 run by the microcontroller 226. The secondary current signals from the current transformers 210, 212 and 214 are coupled to a three-phase rectifier 302 in the power supply circuit 216. The secondary current from the three-phase rectifier 302 charges a stored energy circuit 304 that supplies sufficient power to activate the trip solenoid 228 when the trip circuit 218 is activated. The voltage regulation module 260 ensures that the stored energy circuit 304 maintains sufficient power to activate the trip solenoid 228 in normal operation of the motor circuit protector 100.

The trip circuit 218 may be activated in a number of different ways. As explained above, the over-voltage trip circuit 220 may activate the trip circuit 218 independently of a signal from the trip output 250 of the microcontroller 226. The microcontroller 226 may also activate the trip circuit 218 via a signal from the trip output 250, which may be initiated by the instantaneous trip module 262, the self protection trip module 264, or the over temperature trip module 266. For example, the instantaneous trip module 262 of the control algorithm 230 sends a signal from the trip output 250 to cause the trip circuit 218 to activate the trip solenoid 228 when one of several regions of a trip curve are exceeded. For example, a first trip region A is set just above a current level corresponding to a motor locked rotor. A second trip region B is set just above a current level corresponding to an in-rush current of a motor. The temperature sensor circuit 222 outputs a signal indicative of the temperature, which is affected by load current and ambient temperature, to the over temperature trip module 266. The over temperature trip module 266 will trigger the trip circuit 218 if the sensed temperature exceeds a specific threshold. For example, load current generates heat internally by flowing through the current path components, including the burden resistor, and external heat is conducted from the breaker lug connections. A high fault current may cause the over temperature trip module 266 to output a trip signal 250 (FIG. 2) because the heat conducted by the fault current will cause the temperature sensor circuit 222 to output a high temperature. The over temperature trip module 266 protects the printed wire assembly from excessive temperature buildup that can damage the printed wire assembly and its components. Alternately, a loose lug connection may also cause the over temperature trip module 266 to output a trip signal 250 if sufficient ambient heat is sensed by the temperature sensor circuit 222.

The trip signal 250 is sent to the trip circuit 218 to actuate the solenoid 228 by the microcontroller 226. The trip circuit 218 may actuate the solenoid 228 via a signal from the overvoltage trip circuit 220. The requirements for "Voltage Regulation," ensure a minimum power supply voltage for "Stored Energy Tripping." The trip circuit 218 is operated by the microcontroller 226 either by a "Direct Drive" implementation during high instantaneous short circuits or by the control algorithm 230 first ensuring that a sufficient power supply voltage is present for the "Stored Energy Trip." In the case where the "Stored Energy" power supply voltage has been developed, sending a trip signal 250 to the trip circuit 218 will ensure trip activation. During startup, the power supply 216 may not reach full trip voltage, so a "Direct Drive" trip operation is required to activate the trip solenoid 228. The control for Direct Drive tripping requires a software comparator output sense mode of operation. When the comparator trip threshold has been detected, the power supply charging current is applied to directly trip the trip solenoid 228, rather than waiting for full power supply voltage.

The over-voltage trip circuit 220 can act as a backup trip when the system 200 is in "Charge Mode." The control algorithm 230 must ensure "Voltage Regulation," so that the overvoltage trip circuit 220 is not inadvertently activated. The default configuration state of the microcontroller 226 is to charge the power supply 216. In microcontroller control fault scenarios where the power supply voltage exceeds the over voltage trip threshold, the trip circuit 218 will be activated. Backup Trip Levels and trip times are set by the hardware design.

The user adjustments circuit 224 accepts inputs from the user adjustment dials 114 and 116 to adjust the motor circuit protector 100 for different rated motors and instantaneous trip levels. The dial settings are converted by a potentiometer to distinct voltages, which are read by the trip curves module 268 along with temperature data from the temperature sensor circuit 222. The trip curves module 268 adjusts the trip curves that determine the thresholds to trigger the trip circuit 218. A burden circuit 306 in the power supply circuit 216 allows measurement of the secondary current signal, which is read by the instantaneous trip module 262 from the peak secondary current analog-to-digital input 238 (shown in FIG. 2) along with the trip curve data from the trip curves module 268. The self-protection trip module 264 also receives a scaled current (scaled by a scale factor of the internal comparator in the current measurement circuitry 241) from the burden resistor in the burden circuit 306 to determine whether the trip circuit 218 should be tripped for self protection of the motor circuit protector 100. In this example, fault conditions falling within this region of the trip curve are referred to herein as falling within region C of the trip curve.

As shown in FIGS. 2 and 3, a trip module 265 is coupled between the trip circuit 218 and the voltage regulation module 260. Trip signals from the instantaneous trip module 262, the self protection trip module 264, and the over temperature trip module 266 are received by the trip module 265.

The following terms may be used herein:

DIRECT DRIVE—Initiating a trip sequence using the secondary current from the current transformer 210, 212, 214 to energize the trip solenoid 228 rather than using energy stored in the stored energy circuit 304. A direct drive sequence can be carried out prior to or after achieving a stored energy trip voltage.

STORED ENERGY TRIP—Sending a trip sequence with knowledge of the stored energy trip voltage on the power supply voltage, $V_{CAP}$, 304 using the energy stored in the stored energy circuit 304 to energize the trip solenoid 228.

REDUNDANT TRIP OUTPUT—Send both "trip output" to the trip circuit 218 and "FET off" output to the power supply circuit 216 if the digital trip output was not successful. This will eventually cause the over-voltage circuit 220 to activate the trip solenoid 228.

OVER-VOLTAGE TRIP BACKUP—A trip sequence that uses the over-voltage trip circuit 220 to trip the breaker. This sequence is a backup for the normal "trip circuit" method. This sequence can be activated later in time due to a higher $V_{CAP}$ 304 activation voltage.

Figure 4:
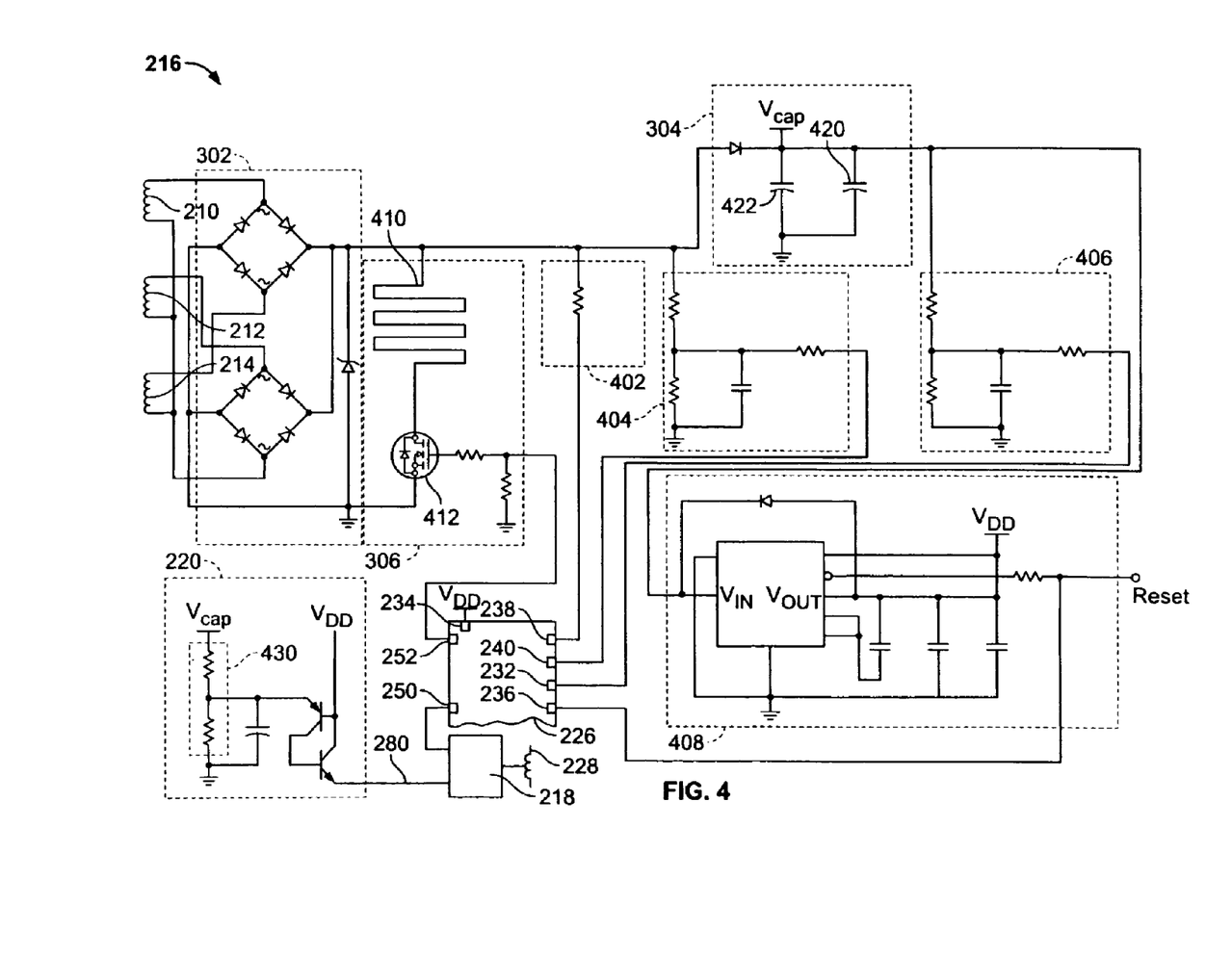
FIG. 4 is a circuit diagram of a stored energy circuit of the motor circuit protector in FIG. 1 and related operating components.

FIG. 4 is a detailed circuit diagram of various circuits of the motor circuit protector 100, including the power supply circuit 216 and other related components including the stored energy circuit 304, the burden circuit 306, a scaled current comparator current input 404, an energy storage capacitor voltage input circuit 406, and a voltage regulator circuit 408. The power supply circuit 216 derives the secondary current from the secondary windings of the three current transformers 210, 212, and 214, which are rectified by the three-phase rectifier 302. The output of the three-phrase rectifier 302 is coupled to the burden circuit 306, which is coupled in parallel to the stored energy circuit 304. The power supply circuit 216 also includes a peak current input circuit 402 that is provided to the microcontroller 226, a scaled current comparator input circuit 404 that is provided to the comparator of the current measurement circuitry 241 of the microcontroller 226 via the scaled secondary current input 240, a stored energy capacitor voltage input circuit 406 and a voltage regulator circuit 408. The stored energy capacitor input 232 of the microcontroller 226 is coupled to the stored energy capacitor input circuit 406, the reference voltage input 234 is coupled to the voltage regulator circuit 408, the secondary current input 238 is coupled to the peak current input circuit 402, and the scaled secondary current input 240 is coupled to the scaled current comparator input circuit 404.

The burden circuit 306 includes a burden resistor 410 connected in series with a burden resistor control field effect transistor (FET) 412. The gate of the burden resistor control FET 412 is coupled to the burden resistor control output 252 of the microcontroller 226. Turning on the burden resistor control FET 412 creates a voltage drop across the burden resistor 410 and the burden resistor control FET 412 allowing measurement of the secondary current for fault detection purposes. The voltage drop may also provide an indication of current available to charge the stored energy circuit 304.

The secondary current from the rectifier 302 is measured by the peak current input circuit 402 and the scaled current comparator input circuit 404. The stored energy circuit 304 includes two energy storage capacitors 420 and 422. The energy storage capacitors 420 and 422 are charged by the secondary current when the burden resistor is control FET 412 is switched off and are discharged by the trip circuit 218 to actuate the trip solenoid 228 in FIG. 2.

The scaled current comparator input circuit 404 has an input that is coupled to the rectifier 302. The scaled current comparator input circuit 404 includes a voltage divider to scale down the signal from the rectifier 302 and is coupled to the scaled secondary current input 240 of the microcontroller 226. The voltage regulator circuit 408 provides a component power supply (in this example, 5 volts nominal) to the electronic components such as the microcontroller 226 in the motor circuit protector 100. The microcontroller 226 includes two internal comparators in the current measurement circuitry 241 that may compare the input 232 or the input 240 with a reference voltage that is received from the voltage regulator circuit 408 to the reference voltage input 234. The reference voltage is also a reference voltage level when the inputs 232 and 240 are configured to be coupled to analog-to-digital converters. When the internal comparator is switched to receive the input 240 to the self protection trip module 264, the peak current is scaled for the comparator input by external hardware such as the scaled current comparator input circuit 404. An internal comparator reference is set by the microcontroller 226 to control the comparator trip thresholds.

The stored energy capacitor voltage input circuit 406 includes the parallel-connected capacitors 420 and 422 and measures the voltage level of the stored energy circuit 304, which is indicative of the stored energy in the capacitors 420 and 422. The stored energy capacitor voltage input circuit 406 provides a signal indicative of the voltage on the capacitors 420 and 422 to the stored energy capacitor input 232 of the microcontroller 226 to monitor the voltage of the stored energy circuit 304.

Upon startup of the motor circuit protector 100 (such as when the user throws the breaker handle 120 to the ON position), the voltage regulator circuit 408 and the microcontroller 226 receive a reset signal from the power supply circuit 216 and the rectifier 302 begins to charge the capacitors 420 and 422. A start-up delay time including a hardware time delay and a fixed software time delay elapses. The hardware time delay is dependent on the time it takes the secondary current to charge the stored energy circuit 304 to a voltage sufficient to operate the voltage regulator circuit 408. In this example, the voltage regulator circuit 408 needs a minimum of 5 volts (nominal) to operate. The fixed software time delay is the time required for stabilization of the regulated component voltage from the voltage regulator circuit 408 to drive the electronic components of the motor circuit protector 100. The software delay time is regulated by an internal timer on the microcontroller 226. The overall start-up delay time typically covers the first half-cycle of the current.

After the start-up delay time, the microcontroller 226 executes the control algorithm 230, which is optionally stored in the internal memory of the microcontroller 226, and enters a "Self Protection" measurement mode, which relies upon the internal comparator of the microcontroller 226 for rapid detection of fault currents. The microcontroller 226 turns on the burden resistor control FET 412 allowing measurement of the secondary current. The burden resistor control FET 412 is turned on for a fixed period of time regulated by the internal timer on the microcontroller 226. The voltage regulation module 260 configures the microcontroller 226 to couple the scaled secondary current input 240 to an input to the internal comparator of the microcontroller 226. The scaled secondary current input 240 reads the signal from the scaled peak current input circuit 404, which measures the secondary current from the rectifier 302 and requires minimal initializing overhead. The peak current from the secondary current is predicted via the secondary current detected by the scaled current comparator input circuit 404.

The internal comparator in the microcontroller 226 is a relatively fast device (compared to, for example, an A/D converter, which may be more accurate but operates more slowly) and thus can detect fault currents quickly while in this mode. If the peak current exceeds a threshold level, indicating a fault current, the burden resistor control FET 412 is turned off by a signal from the burden resistor control output 252 of the microcontroller 226, and the trip signal 250 is sent to the trip circuit 218. The threshold level is set depending on the desired self-protection model of the range of currents protected by the particular type of motor circuit protector 100. The disconnection of the FET 412 causes the fault current to rapidly charge the capacitors 420 and 422 of the stored energy circuit 304 and actuate the trip solenoid 228 to trip the trip mechanism of the motor circuit protector 100, which is visually indicated by the breaker handle 120.

After the initial measurement is taken, the control algorithm 230 enters into a charge only mode of operation in order to charge the capacitors 420 and 422 of the stored energy circuit 304. The control algorithm 230 sends a signal to turn off the burden resistor control FET 412, causing the capacitors 420 and 422 to be charged. The control algorithm 230 remains in the charge only mode until sufficient energy is stored in the stored energy circuit 304 to actuate the trip solenoid 228 in the event of a detected is fault condition. In the charge only mode, the voltage regulation module 260 configures the microcontroller 226 to take a voltage input from the peak current input circuit 402 to the secondary current input 238, which is configured for an analog to digital converter. The signal from the secondary current input 238 analog to digital conversion is more accurate then the internal comparator but relatively slower. During the charge only mode, if a fault current occurs, the stored energy circuit 304 is charged quickly and the fault current actuates the trip solenoid 228 therefore providing self protection.

It should be noted that the control algorithm 230 can be programmed to multiplex current measurement for self-protection sensing and power-supply charging for minimum stored-energy tripping.

The voltage regulation module 260 also configures the internal comparator in the current measurement circuitry 241 to be connected to the stored energy capacitor voltage input circuit 406 via the capacitor voltage input 232 to detect voltage levels from the stored energy circuit 304. The voltage regulation module 260 thus maintains real time monitoring over the regulated voltage output from the stored energy circuit 304 while performing other software tasks such as monitoring fault currents.

During the charge only mode, the control algorithm 230 charges the stored energy circuit 304 from the minimum voltage regulation level (5 volts in this example from the hardware startup period) to a voltage level (15 volts in this example) indicative of sufficient energy to actuate the trip solenoid 228. The charging of the capacitors 420 and 422 is regulated by the voltage regulation module 260, which keeps the burden resistor control FET 412 off via the burden resistor control output 252 causing the capacitors 420 and 422 to charge. The voltage regulation module 260 holds the stored energy circuit 304 in the charge mode until a start voltage threshold level (15 volts in this example) is reached for the supply voltage from the stored energy circuit 304 and is thus sensed through the stored energy capacitor voltage input circuit 406. The timing of when the start voltage threshold level is reached depends on the secondary current from the rectifier 302 to the stored energy circuit 304. The ability of the voltage regulation module 260 to hold the charge mode allows designers to avoid external stability hardware components. This process reduces peak overshoot during high instantaneous startup scenarios while charging the capacitors 420 and 422 to the start voltage threshold level more efficiently.

Once the minimum energy for actuating the trip solenoid 228 is stored, the control algorithm 230 proceeds to a steady state or run mode. In the run mode, the control algorithm 230 maintains control of the voltage from the stored energy circuit 304 with the voltage regulation module 260 after the sufficient energy has been stored for tripping purposes. The voltage regulation module 260 maintains a voltage above the stored energy trip voltage by monitoring the voltage from the stored energy circuit 304 from the stored energy capacitor voltage input circuit 406 to the stored energy capacitor input 232. The stored energy capacitor input 232 is internally configured as an A/D converter input for more accurate voltage level sensing for the run mode.

The voltage regulation module 260 also regulates the stored energy circuit 304 and avoids unintended activation of the over-voltage trip circuit 220. The power supply regulation task is serviced in the run mode on a periodic basis to maintain the necessary energy in the stored energy circuit 304. The regulation task may be pre-empted to service higher priority tasks such as the trip modules 262 and 264. In the run mode, the voltage regulation module 260 monitors the voltage from the stored energy circuit 304. The voltage regulation module 260 maintains the voltage output from the stored energy circuit 304 above the backup trip set points, which include a high set point voltage and a low set point voltage. If the energy falls below a high set point voltage threshold (14.7 volts in this example), the voltage regulation module 260 initiates fixed width charge pulses, by sending control signals via the burden resistor control output 252 to the burden resistor control FET 412 to turn on and off until a high voltage set point for the power supply voltage is reached. The width of the pulse corresponds with the maximum allowable voltage ripple at the maximum charge rate of the stored energy circuit 304. The number of fixed width charge pulses is dependent on the voltage level from the stored energy circuit 304. If the energy is above the high set point voltage, the voltage regulation module 260 will not initiate fixed width charge pulse in order to avoid unintended activation of the over-voltage trip circuit 220.

If the voltage signals detected from the stored energy capacitor voltage input circuit 406 are such that the microcontroller 226 cannot maintain regulation voltage on the stored energy circuit 304, a threshold voltage low set point (13.5 volts in this example) for the stored energy circuit 304 is reached and the control algorithm 230 will charge the stored energy circuit 304 to reach a minimum voltage necessary for trip activation of the trip solenoid 228. The microcontroller 226 will restart the charge mode to recharge the capacitors 420 and 422 in the stored energy circuit 304. During the charging process, fault current measurement is disabled, however if a fault current of significant magnitude occurs, the fault current will rapidly charge the capacitors 420 and 422 of the measured stored energy circuit 304 and thus overall trip performance is not affected. The application will also restart when the watchdog timer in the microcontroller 226 resets.

In the run mode, the microcontroller 226 is in measurement mode by keeping the burden resistor control FET 412 on. The microcontroller 226 monitors the secondary current via the secondary current input 238, which is configured as an analog-to-digital converter for more accurate measurements. The instantaneous trip module 262 sends an interrupt signal from the trip output 250 of the microcontroller 226 to cause the trip circuit 218 to activate the trip solenoid 228 for conditions such as a motor in-rush current or a locked motor rotor (trip conditions A and B), which cause a trip curve to be exceeded based on the secondary current. The internal comparator of the microcontroller 226 is configured to accept an input from the scaled secondary current input 240, which is read by the self protection trip module 264 to determine whether the trip circuit 218 should be tripped for self protection of the motor circuit protector 100 in the case of high instantaneous current (trip condition C) detected from the faster measurement of the comparator. As explained above, the trip conditions for self protection are a function of the user settings from the dials 114 and 116.

In case of a failure of the microcontroller 226 to send the appropriate trip signal 250, the solenoid 228 is triggered by the over voltage trip circuit 220 (shown schematically in FIG. 4). The over voltage trip circuit 220 includes a voltage divider 430, which steps down the voltage level. In this example, pull up transistors cause the over voltage trip circuit 220 to send a discrete trip signal 280 to the trip circuit 218, causing the trip circuit 218 to actuate the trip solenoid 228 to trip the breaker handle 120.

Figure 5A:
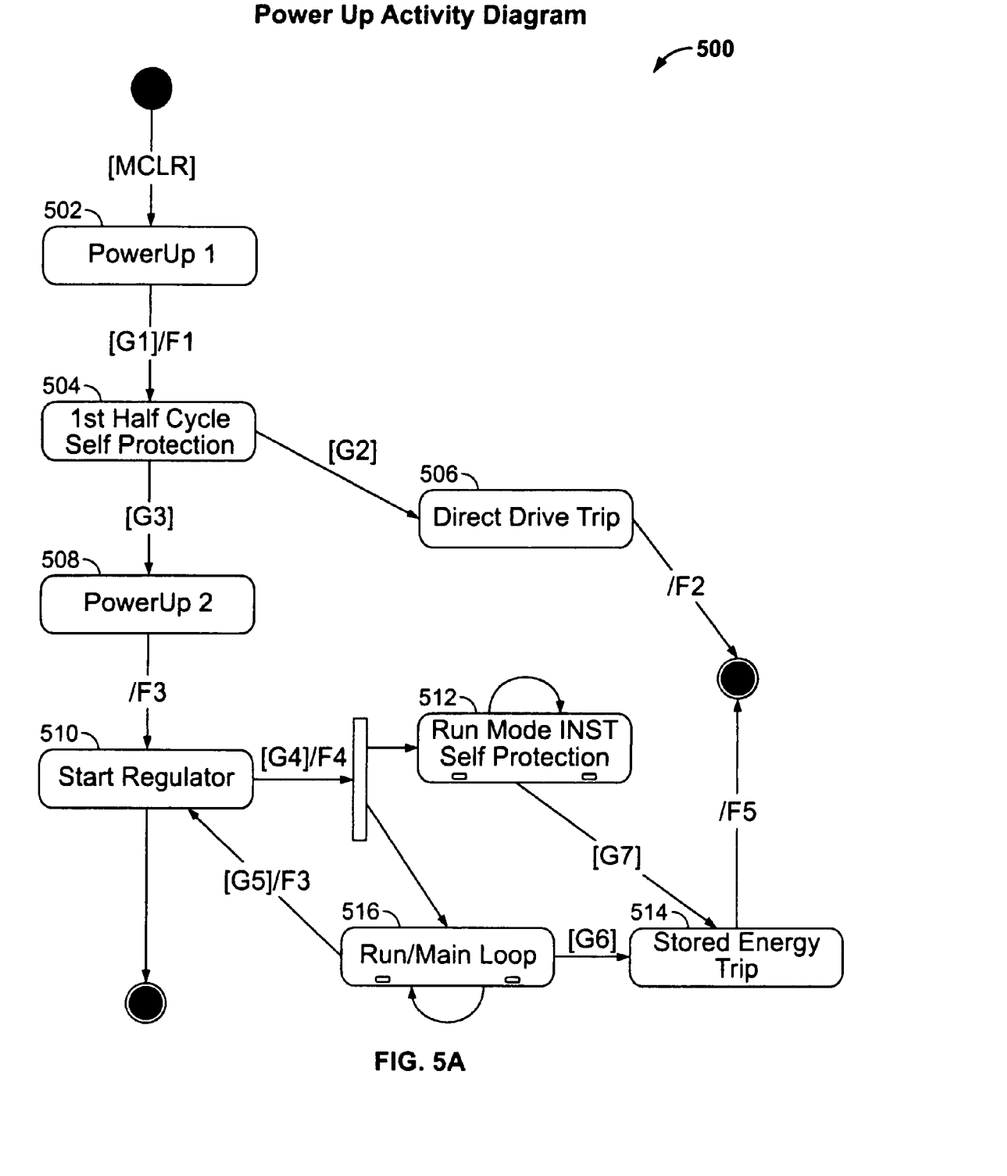
FIG. 5*a* is a diagram expressed in a Unified Modeling Language (UML) illustrating a power-up activity diagram according to an implementation of the present invention.

FIG. 5a is a diagram expressed in a Unified Modeling Language (UML) illustrating a power-up (i.e., startup mode) activity diagram 500 according to an implementation of the present invention. The activity diagram 500 conventionally includes Guards, designated by the letter G, and Actions, designated by the letter F. A legend of the Guards and Actions is provided below:

| Guard | Description |
| --- | --- |
| G1 | Bypass RAM initialization after reset |
| G2 | High instantaneous (INST) self-protection fault sensed (region C) |
| G3 | Self-protection monitor time expired |
| G4 | Stored energy trip voltage |
| G5 | Low regulation voltage |
| G6 | Trip detection |
| G7 | Self-protection trip detection (region C) |

| Action | Description |
| --- | --- |
| F1 | Initialize first half-cycle self-protection (region C) |
| F2 | Direct Drive trip |
| F3 | Initialize for voltage regulation start |
| F4 | Initialize for run (steady-state) mode |
| F5 | Stored Energy trip |

The state diagram 500 initializes to a PowerUp 1 state 502, which detects a power-up or startup of the motor circuit protector 100 (e.g., primary current is applied when the handle 120 is moved to the ON position 124). The control algorithm 230 is initialized for first half-cycle self-protection (region C), and half-cycle self-protection 504 is carried out by the control algorithm 230. If a high INST self-protection fault is sensed (G2), the state diagram 500 moves to a Direct Drive Trip state 506, which activates a Direct Drive trip (F2). Upon expiration of a self-protection monitor time (G3), the state diagram 500 transitions to a PowerUp 2 state 508. The control algorithm 230 initializes for voltage regulation start (in the power supply circuit 216) (F3), and the state diagram 500 transitions to a start regulator state 510. If the voltage regulator in the power supply circuit 216 reaches a Stored Energy trip voltage level, the control algorithm 230 is initialized for a run (or steady-state) mode (F4). A run mode INST self-protection state 512 is maintained until a self-protection trip is detected (G7), and the state diagram 500 enters a Stored Energy trip state 514. Simultaneously with the run mode INST self-protection state 512 is a Run/Main Loop state 516 that attempts to maintain the voltage regulator at the Stored Energy trip voltage level. When the voltage regulator voltage falls below a predetermined threshold, the control algorithm 230 initializes for regulation start (F3) and enters the start regulator state 510 and maintains this loop until the voltage regulator has reached a Stored Energy trip voltage level. In this way, if a trip is detected (G6), the Stored Energy trip state 514 has a sufficient voltage to apply to the trip solenoid 228 to trip the motor circuit protector 100.

Figure 5B:
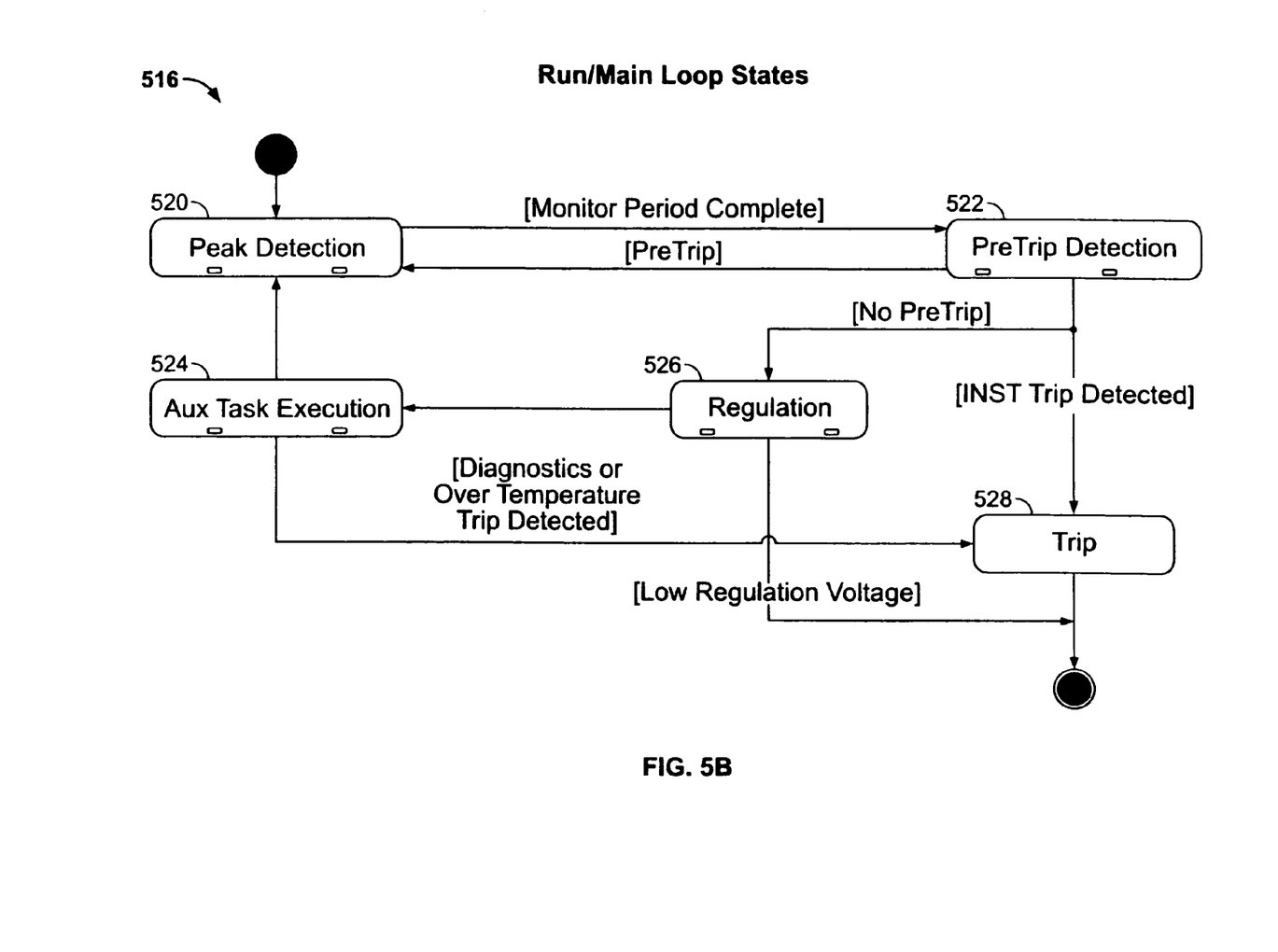
FIG. 5*b* is a UML diagram showing the run/main loop states according to aspects of the various embodiments disclosed herein.

FIG. 5b is a UML diagram of the Run/Main Loop state 516 shown in FIG. 5a. The Run/Main Loop state 516 includes a Peak Detection state 520, a PreTrip Detection state 522, an Auxiliary Task Execution state 524, a Regulation state 526, and a Trip state 528. Secondary currents are sampled via the scaled current comparator input circuit 404 and their peaks are recorded via the peak current input circuit 402 in the Peak Detection state 520. Pre-trip conditions are monitored periodically in the PreTrip Detection state 522. Auxiliary tasks are carried out in the Auxiliary Task Execution state 524, including updating trip curves based on temperature, diagnostics, or dial 114, 116 positions. The Trip state 528 sets the trip software code and activates the trip sequence. The Regulation state 526 monitors and regulates the power supply voltage via the voltage regulation module 260. If a low regulation voltage is detected, the algorithm exits the Run/Main Loop state 516.

Figure 5C:
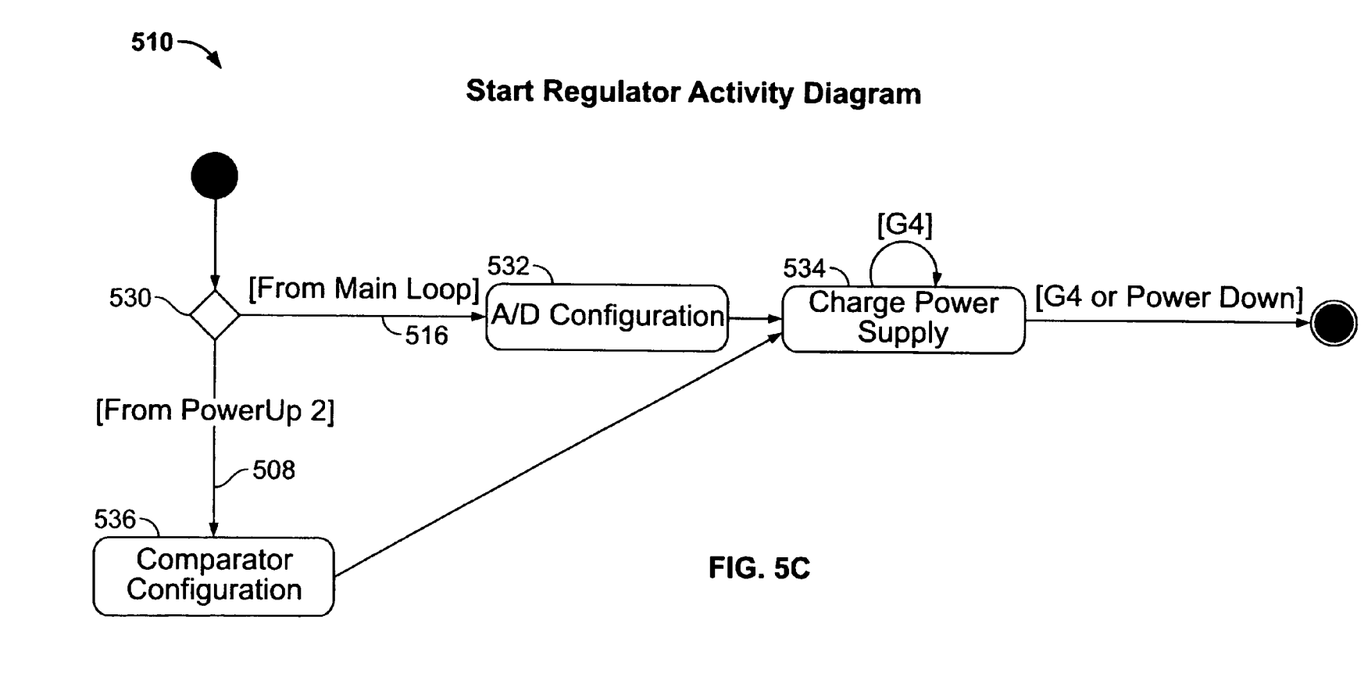
FIG. 5*c* is a UML diagram for a start regulator activity according to aspects of the various embodiments disclosed herein.

FIG. 5c is a UML activity diagram of the Start Regulator state 510 shown in FIG. 5a. If the Start Regulator state 510 is transitioned from the Run/Main Loop state 516, the A/D converter is configured 532 and the power supply is charged 534 to a stored energy trip voltage. If the Start Regulator state 510 is transitioned from the PowerUp 2 state 508, A/D configuration is bypassed and the power supply is charged 534 to a stored energy trip voltage.

Figure 6:
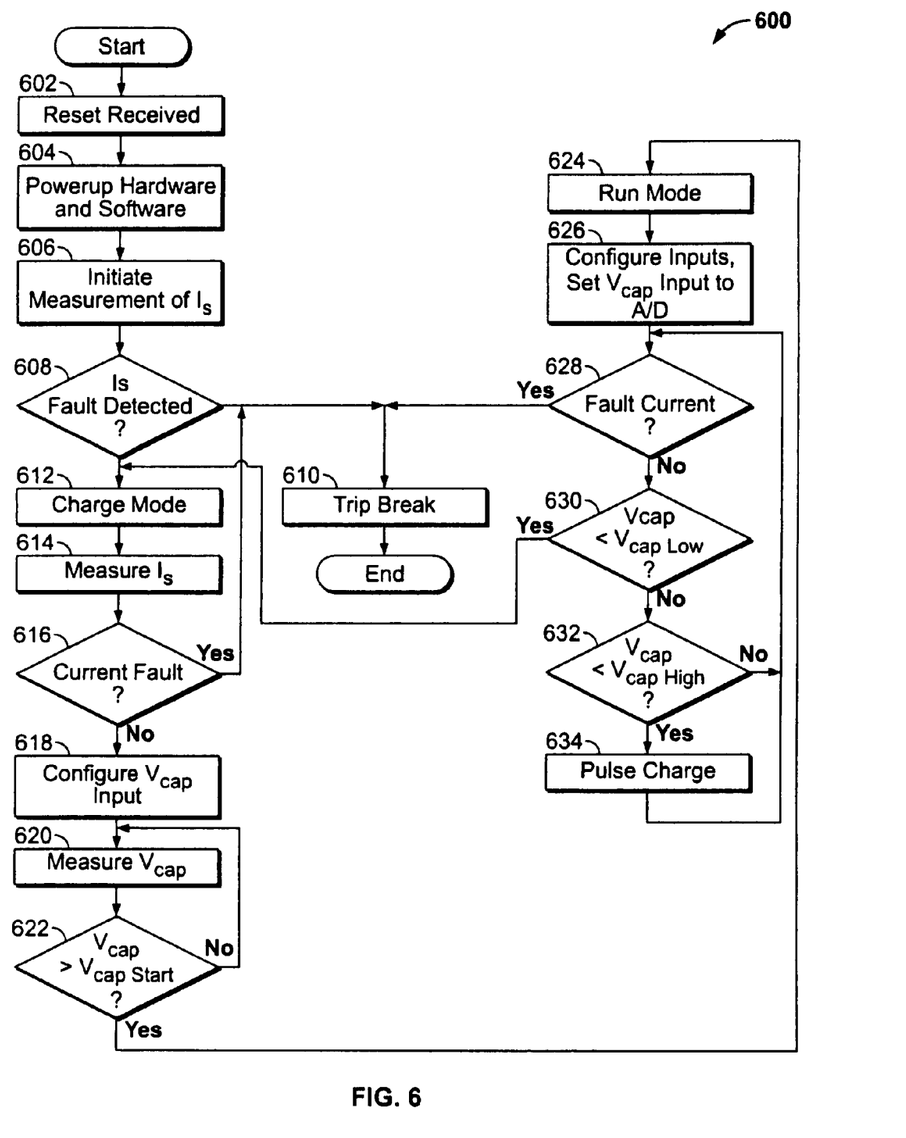
FIG. 6 is a flow chart diagram of a process of the voltage regulation module that is part of the control algorithm of the motor circuit protector in FIG. 1.

Another example flow diagram 600 of the voltage regulation module 260 of the control algorithm 230 for voltage regulation in the motor circuit protector 100 is shown in FIG. 6. In this example, the machine readable instructions comprise an algorithm 600 for execution by: (a) a processor, (b) a controller, such as the microcontroller 226, and/or (c) any other suitable processing device. The algorithm may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented by the flowchart of FIG. 6 may be implemented manually. Further, although the example algorithm is described with reference to the flowchart illustrated in FIG. 6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The motor circuit protector 100 is first activated via the reset of the voltage regulator circuit 408, which causes the stored energy circuit 304 to charge to a level sufficient to run the electronic components (602). The process enters a first power-up mode (604), which provides time to initialize the hardware and software components. After the fixed time has expired for the hardware initialization and the power stabilization to the software components, the microcontroller 226 initializes the software in the first half cycle (e.g., about 4 ms) (606). The microcontroller 226 turns on the burden resistor control FET 412 for a fixed time period and measures whether an excessive instantaneous current is detected by the scaled secondary current input 238 (608). If an excessive instantaneous current is detected by the microcontroller 226, the burden resistor control FET 412 is turned off thereby coupling the secondary current to the stored energy circuit 304, and the breaker trips (610).

After the first half cycle, the microcontroller 226 enters the charge only mode (612). The microcontroller 226 monitors the secondary current via the secondary current input 238 for more accurate measurement via the internal A/D converter (614). If a fault current is detected (616), the trip circuit 218 is activated to trigger a break (610). It is to be understood that the current monitoring functions occurs simultaneously with the charging functions described below. The microcontroller 226 charges the capacitors 420 and 422 of the stored energy circuit 304 by turning off the burden resistor control FET 412 and allowing the secondary current to flow to the stored energy circuit 304. The microcontroller 226 configures the energy storage capacitor voltage input 232 to connect to the internal comparator input (618). The microcontroller 226 measures the voltage of the stored energy circuit 304 (620) to determine whether the voltage has reached the voltage required for the stored energy circuit 304 to actuate the trip solenoid 228. If the voltage has not reached the voltage necessary to actuate the trip solenoid 228 (622), the control algorithm 230 continues the charging process. If the requisite voltage is reached (622), the microcontroller 226 enters the steady-state or run mode (624). This charge only mode completes during the second half cycle, or about 8 ms after power-up. As mentioned earlier, only trip region C is active during the self-protection measurement and charge only modes of operation.

In run mode (624), the microcontroller 226 turns the burden resistor control FET 412 on to allow for measurement of the secondary current. The microcontroller 226 also sets the comparator input in the measurement circuitry 241 to detect whether a high instantaneous current is detected from the scaled peak current input circuit 404, the secondary current input 238 remains operatively coupled to the analog-to-digital converter of the microcontroller 226 and the capacitor voltage input 232 remains operative coupled to the analog-to-digital converter (626). The microcontroller 226 monitors the secondary current continuously while the power cycle occurs for fault currents and high instantaneous currents (628). If no fault or excessive instantaneous currents are detected the microcontroller 226 remains in normal operation. If an excessive instantaneous current is detected, the microcontroller 226 sends a signal to the trip circuit 218 to trip the breaker (610). The microcontroller 226 also detects whether the voltage from the stored energy circuit 304 falls under the low set point voltage threshold (620). If the voltage from the stored energy circuit 304 falls under the low set point voltage, the voltage regulation module 260 changes to the charge mode (612) to recharge the stored energy circuit 304.

If the voltage of the stored energy circuit 304 is over the low set point voltage (630), the microcontroller 226 determines if the voltage from the stored energy circuit 304 is below the high point voltage threshold (632). If the voltage from the stored energy circuit 304 is below the high point voltage threshold, the microcontroller 226 initiates charge pulsing of the secondary current via the burden resistor control FET 412 (634) and returns to the run mode. The charge pulses are of a fixed pulse width. The number of pulses varies depending on the voltage from the stored energy circuit 304. This process continues until the sensed voltage exceeds the high set point voltage threshold.

The voltage regulation module 260 allows a wide operating range such as between 9 A rms through 2500 A rms for the motor circuit protector 100. The module 260 utilizes the configurability of the microcontroller 226 to minimize power supply peak overshoot, minimize voltage regulation ripple, and maintain stored energy trip voltages. The module 260 also reduces the risk of nuisance tripping of the trip circuit 218 while the motor circuit protector 100 transitions between powered and unpowered states. The module 260 cooperates with other modules of the control algorithm 230 to provide a robust fault tolerant backup trip detection system. Although the examples relate to motor circuit protectors, it is to be understood that the principles described above may be applied to all types of circuit breakers.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of regulating voltage for charging a stored energy circuit to store energy sufficient to energize a solenoid of a circuit breaker, the circuit breaker interposed between a power source and an electrical load, the method comprising:
   coupling the stored energy circuit to a current transformer coupled to the power source;
   charging the stored energy circuit to a first voltage level via a secondary current from the current transformer of the circuit breaker;
   interrupting the charging, and measuring the voltage across a burden resistor in parallel with the stored energy circuit;
   resuming charging the stored energy circuit via the secondary current to a second voltage level that is higher than the first voltage level;
   coupling the stored energy circuit to a measurement circuit to measure the voltage of the stored energy circuit; and
   causing the solenoid to actuate a trip mechanism of the circuit breaker, thereby interrupting the flow of current from the power source to the electrical load.

2. The method of claim 1, wherein the circuit breaker is a motor circuit protector and the electrical load includes a motor.

3. The method of claim 1, further comprising:
   entering a run mode when the second voltage level is reached; and
   monitoring, in the run mode, the voltage of the stored energy circuit with the measurement circuit, wherein the measurement circuit includes an analog-to-digital converter.

4. The method of claim 3, further comprising returning the stored energy circuit to a charge mode to charge the stored energy circuit via the secondary current if the voltage of the stored energy circuit falls under a low voltage threshold level.

5. The method of claim 3, further comprising pulsing with pulses the secondary current to the stored energy circuit at a pulse width if the voltage of the stored energy circuit falls under a high voltage threshold level, each pulse having a pulse width.

6. The method of claim 5, further comprising setting the high voltage threshold level to avoid activation of the circuit breaker from an over-voltage condition.

7. The method of claim 5, wherein the pulse width corresponds with a maximum allowable voltage ripple at a maximum charge rate of the stored energy circuit.

8. The method of claim 1, wherein the measurement circuit includes a comparator and an analog-to-digital converter, the method further comprising measuring the voltage of the stored energy circuit via the comparator prior to charging and measuring the voltage of the stored energy circuit via the analog-to-digital converter following charging.

9. The method of claim 1, wherein the measuring the voltage on the burden resistor is carried out for a predetermined delay time.

10. A motor circuit protector for interrupting power from a power source to an electrical load, the motor circuit protector comprising:
    a current transformer having a primary winding and a secondary winding around a core of the current transformer, the primary winding being coupled to the power source;
    a rectifier electrically coupled to the secondary winding;
    a stored energy circuit electrically coupled to the rectifier;
    a trip mechanism actuated by the stored energy circuit; and
    a controller having a configurable voltage input electrically coupled to the stored energy circuit,
    wherein the controller causes the stored energy circuit to be charged to a startup voltage level via a secondary current from the current transformer, interrupts the charging to measure the secondary current, measures the voltage of the stored energy circuit, and charges the stored energy circuit to a stored energy voltage level sufficient to actuate the trip mechanism.

11. The motor circuit protector of claim 10, wherein the controller enters a run mode when the stored energy voltage level is reached, configures the voltage input as an analog-to-digital converter input, and measures the voltage of the stored energy circuit via the voltage input.

12. The motor circuit protector of claim 10, wherein the controller is initialized to a startup mode and configures the voltage input as a comparator input to measure the voltage of the stored energy circuit.

13. The motor circuit protector of claim 11, wherein the controller determines whether the voltage of the stored energy circuit falls below a low voltage threshold level and returns to a charge mode to charge the stored energy circuit via the secondary current.

14. The motor circuit protector of claim 11, wherein the controller pulses the secondary current to the stored energy circuit in response to the voltage of the stored energy circuit falling under a high voltage threshold level.

15. The motor circuit protector of claim 10, wherein the measurement of the voltage of the stored energy circuit is carried out for a predetermined delay time.

16. A controller for a circuit breaker, the circuit breaker including a current transformer having a primary winding coupled to a power source and a secondary winding coupled to a rectifier, a stored energy circuit coupled to the rectifier, and a trip mechanism activated by the stored energy circuit, the controller comprising:
    a secondary current input coupled to the rectifier;
    a stored energy voltage input coupled to the stored energy circuit; and
    a voltage regulation module configuring the controller in response to charging the stored energy circuit to a startup stability voltage level via a secondary current from the current transformer, the controller being configured to:
    interrupt the charging, and measure the voltage across a burden resistor in parallel with the stored energy circuit via the secondary current input,
    resume charging the stored energy circuit via the secondary current to a voltage level, couple the stored energy circuit to the stored energy voltage input to measure the voltage of the stored energy circuit via a first measurement configuration while charging, and measure the voltage of the stored energy circuit via a second measurement configuration responsive to reaching the voltage level.

17. The controller of claim 16, wherein the first measurement configuration includes a comparator and the second measurement configuration includes an analog-to-digital converter.

18. The controller of claim 16, wherein the voltage module determines if the voltage of the stored energy circuit falls below a low voltage set point threshold level and returns to a charge mode to charge the stored energy circuit via the secondary current.

19. The controller of claim 16, wherein the voltage regulation module pulses the secondary current to the stored energy circuit responsive to the voltage of the stored energy circuit falling under a high voltage threshold level.

20. The controller of claim 16, wherein the voltage regulation module reads the measurement of the voltage of the stored energy circuit for a predetermined delay time.

* * * * *